(12) United States Patent
Kinzl et al.

(10) Patent No.: US 9,819,171 B2
(45) Date of Patent: Nov. 14, 2017

(54) ELECTRIC DEVICE COMPRISING A FEEDTHROUGH OF A CABLE THROUGH A HOUSING WALL

(75) Inventors: Niklas Kinzl, Soest (DE); Herwig Rilling, Kamen (DE); Kay-Hendryk Schmidt, Witten (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 812 days.

(21) Appl. No.: 13/557,402

(22) Filed: Jul. 25, 2012

(65) Prior Publication Data

US 2012/0292098 A1  Nov. 22, 2012

Related U.S. Application Data

(63) Continuation of application No. PCT/EP2011/051597, filed on Feb. 3, 2011.

(30) Foreign Application Priority Data

Feb. 6, 2010 (DE) .................. 10 2010 007 093

(51) Int. Cl.
| | |
|---|---|
| *H02G 3/18* | (2006.01) |
| *H02G 15/04* | (2006.01) |
| *H02G 3/06* | (2006.01) |
| *H02G 15/06* | (2006.01) |
| *H02G 15/076* | (2006.01) |
| *H02G 15/08* | (2006.01) |

(52) U.S. Cl.
CPC .......... *H02G 15/046* (2013.01); *H02G 3/065* (2013.01); *H02G 3/0616* (2013.01);
(Continued)

(58) Field of Classification Search
CPC .... H02G 15/046; H02G 3/0675; H02G 15/04; H02G 15/06; H02G 15/08; H02G 15/076;
(Continued)

(56) References Cited

U.S. PATENT DOCUMENTS 3,971,614 A * 7/1976 Paoli et al. .............. 439/321
4,169,572 A * 10/1979 Simon ..................... 248/56
(Continued)

FOREIGN PATENT DOCUMENTS

| DE | 2750713 A1 | 5/1979 |
|---|---|---|
| DE | 3018119 A1 | 11/1981 |

(Continued)

OTHER PUBLICATIONS

The International Bureau of WIPO, International Preliminary Report on Patentability for corresponding International Patent Application No. PCT/EP2011/051597 dated Dec. 13, 2012.

*Primary Examiner* — Timothy Thompson
*Assistant Examiner* — Paresh Paghadal
(74) *Attorney, Agent, or Firm* — Brooks Kushman P.C.

(57) ABSTRACT

An electric device includes a housing and a cable. The housing has a pipe bracket disposed on the housing. The pipe bracket includes an interior pathway extending from a free-end of the pipe bracket into the housing. The free-end of the pipe bracket has teeth thereon. The cable has a union nut and a sleeve. The sleeve has a crimped section attached to the cable such that the crimped section is non-displaceable. The sleeve further has a toothed annular surface. In an installed state of the cable to the housing, a feedthrough portion of the cable extends through the interior pathway of the pipe bracket and into the housing. The union nut encompasses the sleeve and is attached to the pipe bracket to thereby press the toothed annular surface of the sleeve against the teeth of the pipe bracket such that the cable is fixed rotationally to the housing.

15 Claims, 3 Drawing Sheets

(52) U.S. Cl.
CPC ......... *H02G 3/0625* (2013.01); *H02G 3/0641* (2013.01); *H02G 3/0658* (2013.01); *H02G 3/0666* (2013.01); *H02G 3/0675* (2013.01); *H02G 15/04* (2013.01); *H02G 15/06* (2013.01); *H02G 15/076* (2013.01); *H02G 15/08* (2013.01)

(58) Field of Classification Search
CPC .. H02G 3/0616; H02G 3/0625; H02G 3/0641; H02G 3/065; H02G 3/0658; H02G 3/0666
USPC .......................................... 174/520, 650–660
See application file for complete search history.

(56) References Cited

U.S. PATENT DOCUMENTS

| | | | |
|---|---|---|---|
| 4,432,520 A | 2/1984 | Simon | |
| 4,436,265 A * | 3/1984 | Simon | 248/56 |
| 5,321,205 A * | 6/1994 | Bawa et al. | 174/655 |
| 5,866,853 A * | 2/1999 | Sheehan | 174/653 |
| 6,863,567 B2 | 3/2005 | Schmitt | |
| 6,877,781 B2 * | 4/2005 | Edler | 285/354 |
| 6,890,006 B2 * | 5/2005 | Crestin et al. | 285/342 |
| 7,097,516 B2 | 8/2006 | Werner et al. | |
| 7,431,602 B2 * | 10/2008 | Corona | 439/272 |
| 7,476,128 B2 | 1/2009 | Schmitt | |
| 7,648,373 B2 * | 1/2010 | Dixon et al. | 439/98 |
| 2004/0119246 A1 * | 6/2004 | Woller et al. | 277/602 |
| 2005/0054244 A1 * | 3/2005 | Werner et al. | 439/682 |
| 2008/0176447 A1 * | 7/2008 | Schmitt | 439/606 |

FOREIGN PATENT DOCUMENTS

| | | |
|---|---|---|
| DE | 20116680 U1 | 12/2001 |
| DE | 20311183 U1 | 7/2004 |
| DE | 202007001070 U1 | 3/2007 |
| EP | 0058739 A2 | 9/1982 |

* cited by examiner

US 9,819,171 B2

ELECTRIC DEVICE COMPRISING A FEEDTHROUGH OF A CABLE THROUGH A HOUSING WALL

CROSS-REFERENCE TO RELATED APPLICATIONS

This application is a continuation of International Application No. PCT/EP2011/051597, published in German, with an International filing date of Feb. 3, 2011, which claims priority to DE 10 2010 007 093.9, filed Feb. 6, 2010; the disclosures of which are incorporated in their entirety by reference herein.

TECHNICAL FIELD

The present invention relates to an electric device having a housing and a cable to be installed to the housing, the housing having a pipe bracket disposed on an exterior side of the housing, the pipe bracket having an interior pathway extending from a front end of the pipe bracket farthest from the housing into the interior of the housing, the front surface of the pipe bracket having teeth, the cable having a union nut and a sleeve having a toothed annular surface, wherein in the installed state, a feedthrough portion of the cable extends through the interior pathway of the pipe bracket and into the interior of the housing, the union nut overlaps the sleeve and presses against the pipe bracket, and the toothed annular surface of the sleeve abuts against the teeth of the pipe bracket.

BACKGROUND

DE 201 16 680 U1 (corresponds to U.S. Pat. No. 6,863,567) describes such an electric device having a housing and a cable to be installed to the housing. A pipe bracket having a flange piece is provided for assembling the cable to the housing. The pipe bracket is disposed on and attached by a nut screwed onto the pipe bracket on the housing wall. In order to attach the cable, a hollow-cylindrical support is inserted between the cable sheath and the cable leads. A sleeve crimped onto the cable sheath holds the support in place. The support is assembled in a form-fitting manner to a molded part, which has a toothed front surface that is pressed by a union nut. The union nut can be screwed onto the pipe bracket against the corresponding toothed front surface of the pipe bracket. An annular cover region of the union nut presses in the axial direction against a sealing ring. The sealing ring is inserted into an annular groove of the molded part.

The previously introduced electric cabling creates a sealed, rotationally fixed, and strain-relieved cable feedthrough on the housing of the electric device. The amount of parts to be connected and the effort for assembling the cabling is relatively large for this device.

SUMMARY

An object of the present invention includes an electric device having a cable feedthrough installed to a housing in which the cable feedthrough is sealed against moisture, rotationally fixed, and strain-relieved and which can be assembled and installed with a small amount of effort.

In carrying out at least one of the above and other objects, the present invention provides an electric device having a housing and a cable assembly. The housing has a pipe bracket. The pipe bracket is disposed at one end on the housing and includes an interior pathway extending from a free-end of the pipe bracket into the housing. The free-end of the pipe bracket has teeth thereon. The cable assembly has a cable and a union nut and a sleeve on the cable. The sleeve has a crimped section and an annular-shaped section. The crimped section is attached to the cable such that the crimped section is non-displaceable. The annular shaped section forms a toothed annular surface and a flat annular surface. In an installed state of the cable to the housing, a feedthrough portion of the cable extends through the interior pathway of the pipe bracket and into the housing. The union nut encompasses the sleeve and is attached to the pipe bracket to thereby press the toothed annular surface of the sleeve against the teeth of the free-end of the pipe bracket such that the cable is fixed rotationally to the housing.

Embodiments of the present invention are directed to an electric device having a housing and a cable to be installed to the housing. The housing includes a pipe connector (e.g., a pipe bracket) disposed on the exterior side of a wall of the housing. The pipe bracket is integral with the housing wall. The pipe bracket is annular shaped and bounds an interior pathway therein. The interior pathway extends from the free-end face of the pipe bracket through the housing wall and into the interior of the housing. The free-end face of the pipe bracket includes teeth thereon. The cable has a union nut and a sleeve. The sleeve has a crimped section and an annular shaped section. The crimped section of the sleeve is crimped to the cable such that it is not displaceable. The annular shaped section of the sleeve forms a toothed annular surface on one side and a flat annular surface on the opposite side.

In the installed state, a feedthrough portion of the cable extends through the interior pathway of the pipe bracket and into the interior of the housing. The union nut encompasses the sleeve and is screwed onto the pipe bracket. The toothed annular surface of the sleeve is pressed and seated against the teeth of the free-end face of the pipe bracket due to the union nut being screwed onto the pipe bracket. As a result, the cable is fixed rotationally to the housing. Further, the union nut lies against and axially presses the flat annular surface of the sleeve towards the crimped section of the sleeve such that the sleeve cannot be axially displaced. Consequently, the cable, which is rigidly connected to the sleeve, is now strain-relieved at the housing.

As described, the pipe bracket is formed integrally with the housing wall and the sleeve is connected to the cable sheath such that the sleeve cannot be displaced. The non-displaceable connection of the sleeve prevents both rotational motions and axial displacements of the sleeve with respect to the cable sheath.

As the pipe bracket is integrally molded to the housing wall, the pipe bracket does not need to be assembled to the housing in a time consuming manner, whereby a cost advantage is obtained.

Additional cost advantages result as only a few individual components are needed when using the union nut, the simply constructed sleeve, and the seal for attaching the cable to the pipe bracket in order to install the cable to the housing. The individual components of the union nut, the sleeve, and the seal can be preassembled by simply pushing them onto the cable. The sleeve has a non-displaceable attachment to the cable sheath. This attachment can be accomplished by crimping a sleeve-shaped section of the sleeve on the outside surface of the cable sheath. Crimping enables a fast and simple attachment of the sleeve without the sleeve cutting into the cable sheath or the cable lead lying below the cable sheath.

In embodiments of the present invention, the sleeve is glued to a part of the cable sheath and/or the corresponding part of the cable sheath is coated with a plastic material that forms the sleeve.

The seal does not require a special mounting on either the sleeve or the cable. The seal is positioned by simply sliding onto the portion of the cable directly in front of the sleeve.

In embodiments of the present invention, the union nut is a hollow-cylindrical shaped union nut. The inner wall of the union nut has integrally molded teeth. The teeth of the union nut create latching connections with corresponding latching hooks on the outer surface of the pipe bracket when the union nut is screwed onto the pipe bracket. Through these latching connections the screw connection between the union nut and the pipe bracket is secured.

In embodiments of the present invention, the teeth of the inner wall of the union nut and the latching hooks on the outer surface of the pipe bracket are formed asymmetrically and have different slopes for the two directions of rotation. As a result, screwing the union nut on the outer surface of the pipe bracket can thereby be accomplished with a significantly smaller effort than the effort for unscrewing the union nut from the pipe bracket.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
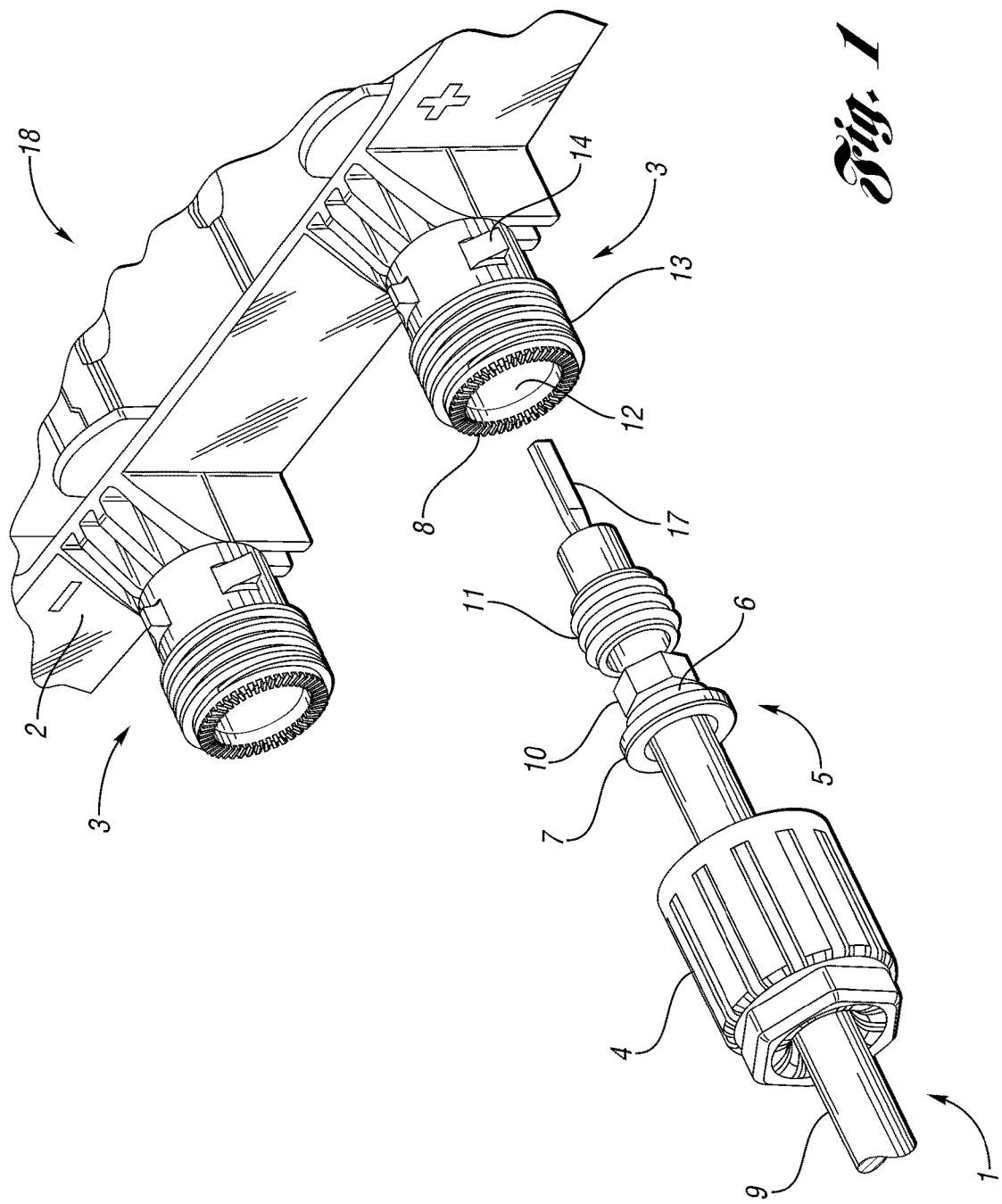
FIG. 1 illustrates a partial sectional view of an electric device having a housing and a cable to be installed to the housing in accordance with an embodiment of the present invention.

Referring now to FIG. 1, an electric device in accordance with an embodiment of the present invention will be described. The electric device includes a housing 18 and a cable 1. Cable 1 is to be installed to housing 18. Housing 18 includes a pipe bracket 3. (Housing 18 is illustrated in FIG. 1 with two pipe brackets 3.). Pipe bracket 3 in disposed on the exterior side of a wall 2 of housing 18. Pipe bracket 3 is integrally molded on housing wall 2.

Pipe bracket 3 is configured to be connected with cable 1 such that cable 1 is installed to housing 18 when cable 1 is connected to pipe bracket 3. Pipe bracket 3 is annular shaped and bounds an interior pathway or through-hole 12 therein. Through-hole 12 of pipe bracket 3 leads into the interior of housing 18. Through-hole 12 extends from the free-end of pipe bracket 3 through housing wall 2 and into the interior of housing 18. The free-end of pipe bracket 3 is the other end of pipe bracket 3 which is not disposed on housing wall 2 as shown in FIG. 1. The front surface of the free-end of pipe bracket 3 includes integrally molded teeth 8 thereon. The outer surface of pipe bracket 3 includes threading 13 and latching hooks 14 thereon. Threading 13 is in a front section of the outer surface of pipe bracket 3 adjacent to the free-end of pipe bracket 3. Latching hooks 14 are on a rear section of the outer surface of pipe bracket 3 that is nearest to housing wall 2. Latching hooks 14 are slanted on the outer surface of pipe bracket 3. Latching hooks 14 have a smaller slope in the clockwise direction for screwing on than in the opposite direction for unscrewing off.

Cable 1 is configured to connect with pipe bracket 3 in order to be installed to housing 18. In FIG. 1, cable 1 is disconnected from pipe bracket 3, but is positioned near pipe bracket 3 in front of the free-end of pipe bracket 3. As such, cable is in position to be connected to pipe bracket 3.

Cable 1 includes an exterior cable sheath 9. Cable 1 further includes wiring which runs through the interior of cable 1 encompassed by cable sheath 9. Cable 1 further includes a hollow-cylindrically shaped union nut 4, a sleeve 5, and a bellows-shaped rubber washer seal 11. Union nut 4, sleeve 5, and seal 11 are pushed over and onto cable sheath 9 as shown in FIG. 1.

Sleeve 5 includes a crimping section 10 and an annular-shaped section. The annular-shaped section of sleeve 5 forms a toothed annular surface 6 and a flat annular surface 7. Toothed annular surface 6 of sleeve 5 is on the side of sleeve 5 facing toward pipe bracket 3 as shown in FIG. 1. Flat annular surface 7 is on the opposite side of sleeve 5 facing toward union nut 4 as shown in FIG. 1.

Crimping section 10 of sleeve 5 is crimped onto cable 1 by a crimping tool and is thereby fastened to cable sheath 9 such that crimping section 10 cannot be displaced. As such, sleeve 5 is connected non-displaceably to the exterior of cable sheath 9. Since sleeve 5 thus forms a crimping sleeve, it is designed as an integrally fabricated metal piece. Alternatively, sleeve 5 is a plastic part fabricated by extrusion coating of cable sheath 9 and is fastened to cable sheath 9 so that sleeve 5 cannot be displaced. In another embodiment, sleeve 5 is made of metal or plastic and is fastened directly to cable sheath 9 by glue.

As described, cable 1 is preassembled with union nut 4 and attached sleeve 5 and seal 11. Union nut 4, sleeve 5, and seal 11 are initially slid onto and over cable sheath 9 in order to form cable 1 in its preassembled state. Cable sheath 9 of the front section of cable 1 is stripped to expose stripped cable lead 17.

With reference to FIGS. 2, 3, 4, and 5, the front section of cable 1 (i.e., a feedthrough portion of cable 1) inserts into through-hole 12 of pipe bracket 3 with stripped cable lead 17 leading the way in order for cable 1 to connect with pipe bracket 3. Cable 1 connects with pipe bracket 3 in this manner in order to be installed to housing 18 of the electric device. In the installed state, the feedthrough portion of cable 1 extends through through-hole 12 of pipe bracket 3 with stripped cable lead 17 extending through housing wall 2 into the interior of housing 18. Stripped cable lead 17 is connected in a conventional manner by connector elements inside housing 18.

Figure 2:
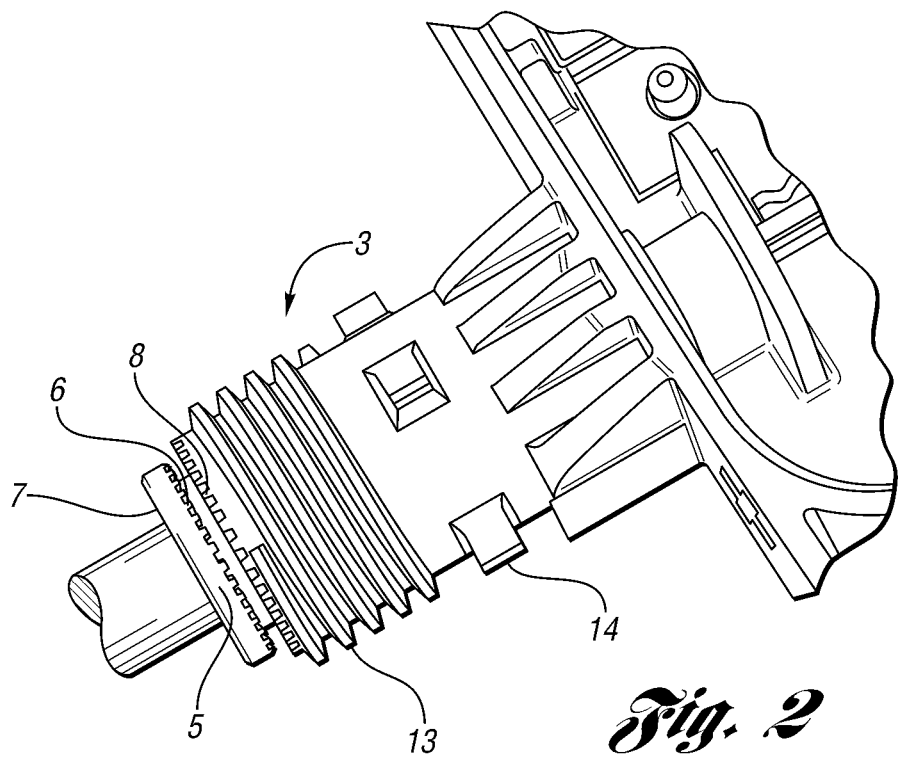
FIG. 2 illustrates a view of the cable and a pipe bracket of the housing with the cable being connected to the pipe bracket to install the cable to the housing.

FIG. 2 illustrates the state of assembly achieved after insertion of cable 1 into through-hole 12 of pipe bracket 3. Crimping section 10 and seal 11 of sleeve 5 are fully gripped by through-hole 12. Toothed annular surface 6 of sleeve 5 lies just in front of teeth 8 on the front surface of the free-end of pipe bracket 3. In this manner, the rotational position of cable 1 can be modified with respect to pipe bracket 3 during this phase of the assembly.

Figure 3:
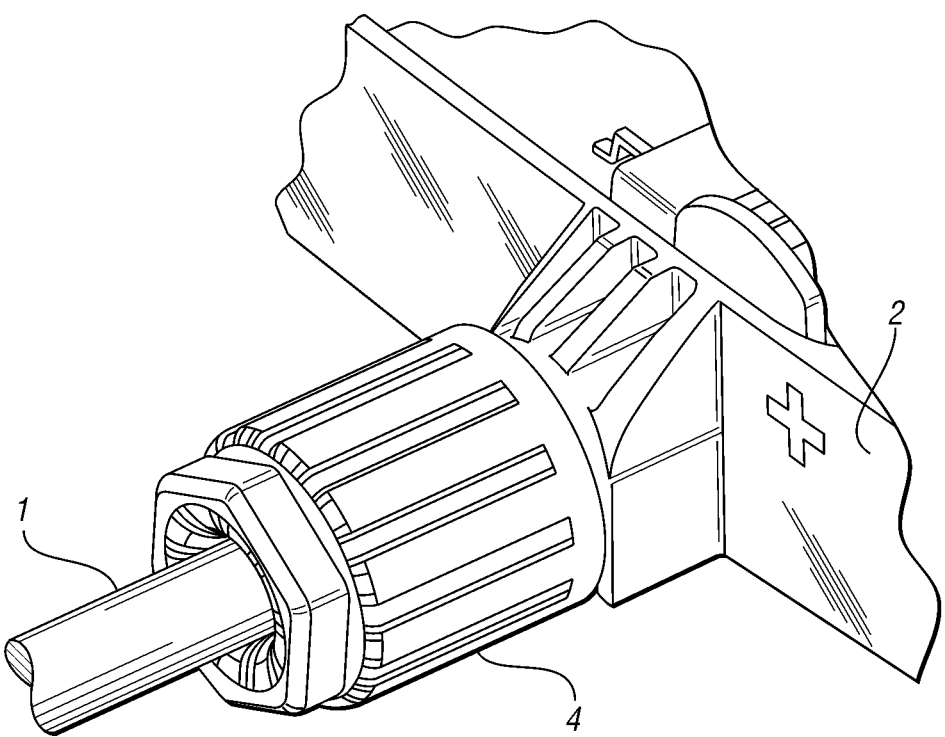
FIG. 3 illustrates a view of the cable connected to the pipe bracket of the housing such that the cable is installed to the housing.

With reference to FIG. 3, union nut 4 screws onto threading 13 of the outer surface of pipe bracket 3 during a further assembly phase. Union nut 4 encompasses sleeve 5 when union nut 4 is screwed onto pipe bracket 3. The screwing of union nut 4 onto pipe bracket 3 causes toothed annular surface 6 of sleeve 5 to press and be seated against teeth 8 of the free-end of pipe bracket 3. As a result, cable 1 is fixed rotationally to housing 18. Sleeve 5 is also fastened to pipe bracket 3 due to union nut 4 lying and axially pressing against flat annular surface 7 of sleeve 5. As such, sleeve 5 can also not be axially displaced. As a result, cable 1 with sleeve 5 rigidly connected thereto is strain-relieved at housing 18. The state of assembly achieved in this way is shown in FIG. 3.

Figure 4:
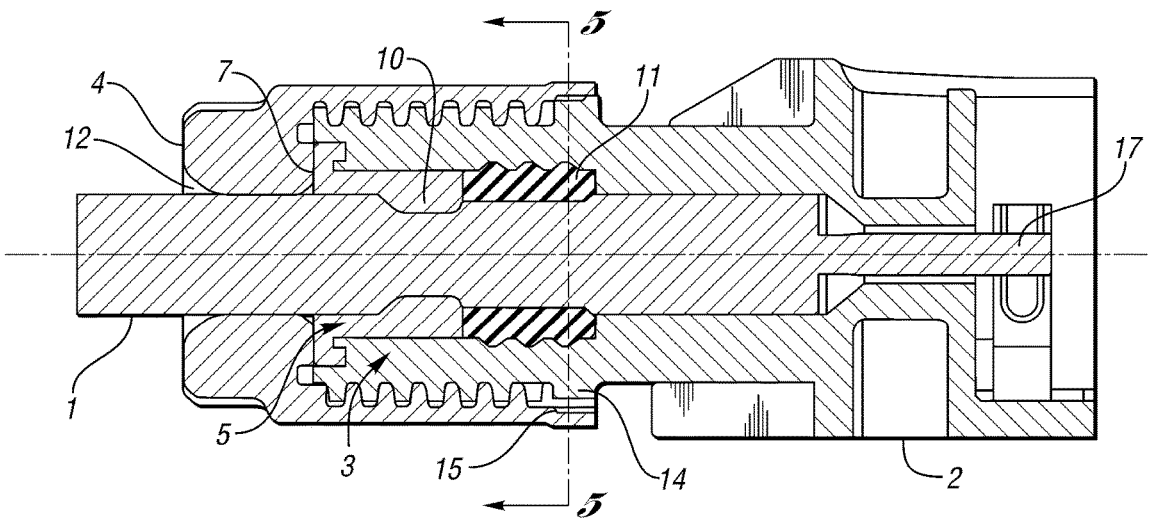
FIG. 4 illustrates a sectional view of FIG. 3.

The resulting assembly after cable lead 17 is connected inside the interior of housing 18 is shown in the sectional view of FIG. 4. Crimping section 10 and seal 11 of sleeve 5 are arranged to have a relatively broad cross-section in through-hole 12 of pipe bracket 3. The size of through-hole 12 is reduced behind seal 11 to the cross-sectional size of cable 1. In this manner, an optimal sealing of through-hole 12 is achieved through seal 11.

Figure 5:
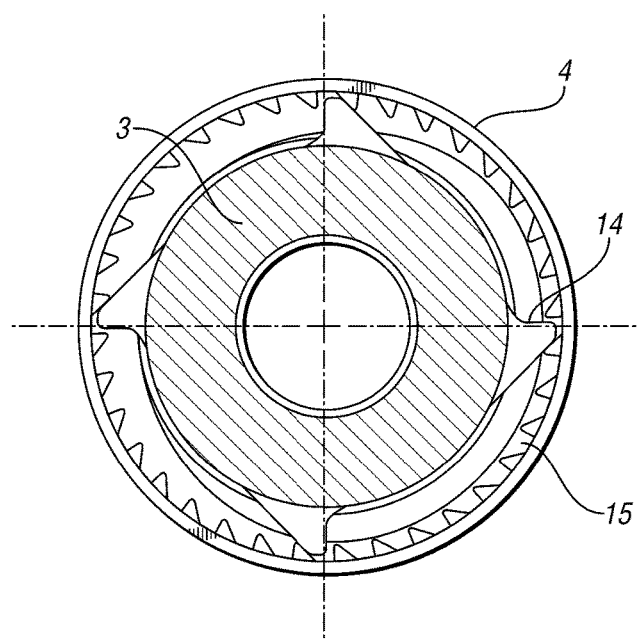
FIG. 5 illustrates a cross-sectional view of a union nut of the cable screwed onto the pipe bracket when the cable is connected to the pipe bracket to install the cable to the housing.

FIG. 5 illustrates a cross-sectional view through the plane A-A of FIG. 4 as seen from the side of housing 18. As described, the outer surface of pipe bracket 3 includes latching hooks 14 thereon. Union nut 4 includes teeth 15 on the inner wall of union nut 4. Teeth 15 of union nut 4 and latching hooks 14 of pipe bracket 3 latch with one another when union nut 4 is screwed onto pipe bracket 3. Latching hooks 14 and teeth 15 are asymmetrically molded and form slanted elements along the circumferential direction. Latching hooks 14 and teeth 15 have different slopes depending on the direction of rotation. In this manner, union nut 4 can be screwed onto pipe bracket 3 with a relatively small effort. Conversely, loosening the screw connection between union nut 4 and pipe bracket 3 requires relatively greater effort or may be possible by only destroying the latching connection produced between latching hooks 14 and teeth 15. Such an embodiment of latching means 14, 15 is advantageous when cable 1 can support a high tensile force, and loosening the cable screw is hindered, without increasing the effort needed during the prior assembly.

The electric device can be used as a component of a photovoltaic facility.

REFERENCE SYMBOLS

1 cable
2 housing wall
3 pipe bracket
4 union nut
5 sleeve
6 toothed-annular surface
7 flat-annular surface
8 teeth
9 cable sheath
10 crimping section
11 seal
12 through-hole
13 threads
14 latching hook
15 teeth
17 cable lead
18 housing While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electric device comprising:
   a housing having a pipe bracket, the pipe bracket disposed at one end on the housing and including an interior pathway extending from a free-end of the pipe bracket into the housing, the free-end of the pipe bracket having teeth thereon; and
   a cable assembly having a cable and a union nut and a sleeve on the cable, the sleeve being an integrally formed component having a crimped section and an annular-shaped section, the crimped section being attached to an outer sheath of the cable such that the sleeve is non-displaceable connected to the cable whereby rotational motion and axial displacement of the sleeve with respect to the cable are prevented during both of an installed state of the cable assembly to the housing and an uninstalled state of the cable assembly separated from the housing, the annular shaped section forming a toothed annular surface on one side and a flat annular surface on an opposite side, the crimped section being attached to the outer sheath of the cable on the side of the annular shaped section forming the toothed annular surface;
   wherein in the installed state of the cable assembly to the housing, a feedthrough portion of the cable extends through the interior pathway of the pipe bracket and into the housing with the crimped section of the sleeve being inserted into the interior pathway of the pipe bracket, and the union nut encompasses the annular shaped section of the sleeve and the pipe bracket with the crimped section therein and is attached to the pipe bracket to thereby press the toothed annular surface of the annular shaped section of the sleeve against the teeth of the free-end of the pipe bracket such that the cable is fixed rotationally to the housing.

2. The electric device of claim 1 wherein:
   the pipe bracket is formed integrally with the housing to be disposed at the one end on the housing.

3. The electric device of claim 1 wherein:
   in the installed state of the cable assembly to the housing, the union nut lies against and axially presses the flat annular surface of the annular shaped section of the sleeve towards the crimped section of the sleeve such that the sleeve is axially fixed whereby the cable is strain-relieved to the housing.

4. The electric device of claim 1 wherein:
the crimped section of the sleeve is crimped onto the cable to be attached to the cable such that the sleeve is non-displaceable connected to the cable.

5. The electric device of claim 1 wherein:
the crimped section of the sleeve is glued onto the cable to be attached to the cable such that the sleeve is non-displaceable connected to the cable.

6. The electric device of claim 1 wherein:
the cable assembly further includes a seal on the cable, wherein the seal is arranged in the interior pathway of the pipe bracket ahead of the crimping section in the installed state of the cable to the housing.

7. The electric device of claim 1 wherein:
the pipe bracket includes latching hooks;
the union nut includes teeth;
wherein the teeth of the union nut and the latching hooks of the pipe bracket engage when the union nut is attached to the pipe bracket.

8. The electric device of claim 1 wherein:
the teeth of the union nut and the latching hooks of the pipe bracket are asymmetric with one another.

9. The electric device of claim 1 wherein:
the housing includes a plurality of integrally molded pipe brackets disposed thereon for installation with respective cables.

10. The electric device of claim 1 wherein:
the electric device is a component of a photovoltaic facility.

11. The electric device of claim 1 wherein:
the teeth of the union nut and the latching hooks of the pipe bracket are asymmetric with one another.

12. An electric device comprising:
a housing having a pipe bracket, the pipe bracket disposed at one end on the housing and including an interior pathway extending from a free-end of the pipe bracket into the housing, the free-end of the pipe bracket having teeth thereon; and
a cable assembly having a cable and a union nut and a sleeve on the cable, the sleeve being an integrally formed component having a crimped section and an annular-shaped section, the crimped section being crimped to an outer sheath of the cable such that the sleeve is non-displaceable connected to the cable and is fixed rotationally and axially in place with respect to the cable during both of an installed state of the cable to the housing and an uninstalled state of the cable separated from the housing, the annular shaped section forming a toothed annular surface on one side and a flat annular surface on an opposite side, the crimped section being attached to the outer sheath of the cable on the side of the annular shaped section forming the toothed annular surface;
wherein in the installed state of the cable to the housing, a feedthrough portion of the cable extends through the interior pathway of the pipe bracket and into the housing with the crimped section of the sleeve being inserted into the interior pathway of the pipe bracket, and the union nut encompasses the annular shaped section of the sleeve and the pipe bracket with the crimped section therein and is attached to the pipe bracket to thereby press the toothed annular surface of the annular shaped section of the sleeve against the teeth of the free-end of the pipe bracket such that the cable is fixed rotationally to the housing.

13. The electric device of claim 12 wherein:
in the installed state of the cable to the housing, the union nut lies against and axially presses the flat annular surface of the annular shaped section of the sleeve towards the crimped section of the sleeve such that the sleeve is axially fixed whereby the cable is strain-relieved to the housing.

14. The electric device of claim 12 wherein:
the cable assembly further includes a seal on the cable, wherein the seal is arranged in the interior pathway of the pipe bracket ahead of the crimping section in the installed state of the cable to the housing.

15. The electric device of claim 12 wherein:
the pipe bracket includes latching hooks;
the union nut includes teeth;
wherein the teeth of the union nut and the latching hooks of the pipe bracket engage when the union nut is attached to the pipe bracket.

* * * * *